United States Patent
Saito et al.

(10) Patent No.: US 11,650,283 B2
(45) Date of Patent: May 16, 2023

(54) DETECTION DEVICE

(71) Applicant: FUJITSU COMPONENT LIMITED, Tokyo (JP)

(72) Inventors: Maiko Saito, Tokyo (JP); Masaru Sakurai, Tokyo (JP); Syunichi Iizuka, Tokyo (JP); Masahiro Yanagi, Tokyo (JP); Kimihiro Maruyama, Toyko (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 562 days.

(21) Appl. No.: 16/774,649

(22) Filed: Jan. 28, 2020

(65) Prior Publication Data

US 2020/0256945 A1 Aug. 13, 2020

(30) Foreign Application Priority Data

Feb. 13, 2019 (JP) .............................. JP2019-023864

(51) Int. Cl.
*G01S 7/02* (2006.01)
*G01S 13/56* (2006.01)

(52) U.S. Cl.
CPC ............ *G01S 7/023* (2013.01); *G01S 7/0232* (2021.05); *G01S 13/56* (2013.01)

(58) Field of Classification Search
CPC ......... G01S 7/023; G01S 7/0232; G01S 13/56
See application file for complete search history.

(56) References Cited

U.S. PATENT DOCUMENTS

| | | | | |
|---|---|---|---|---|
| 6,121,917 A | * | 9/2000 | Yamada | G01S 13/42 342/107 |
| 2005/0162304 A1 | * | 7/2005 | Mitsugi | G01S 7/021 342/57 |
| 2008/0100493 A1 | | 5/2008 | Akita et al. | |
| 2010/0019950 A1 | * | 1/2010 | Yamano | G01S 13/42 342/104 |
| 2015/0181619 A1 | | 6/2015 | Kubo | |
| 2016/0238694 A1 | * | 8/2016 | Kishigami | G01S 7/292 |

FOREIGN PATENT DOCUMENTS

| | | | | |
|---|---|---|---|---|
| JP | 8-33044 | | 2/1996 | |
| JP | 08-054457 | | 2/1996 | |
| JP | 11133142 | A * | 5/1999 | ........... G01S 13/345 |
| JP | 2002-174677 | | 6/2002 | |
| JP | 2007-248215 | A | 9/2007 | |
| JP | 2008-107280 | | 5/2008 | |
| JP | 2015-122660 | | 7/2015 | |
| JP | 2016-065823 | A | 4/2016 | |

OTHER PUBLICATIONS

Notice of Reasons for Refusal dated Nov. 1, 2022 in corresponding Japanese Patent Application No. 2019-023864 (4 pages) (4 pages English translation).

Japanese Office Action issued in Japanese Patent Application No. 2019-023864 dated Mar. 28, 2023.

* cited by examiner

*Primary Examiner* — Timothy A Brainard
*Assistant Examiner* — Helena H Seraydaryan
(74) *Attorney, Agent, or Firm* — Staas & Halsey LLP

(57) ABSTRACT

A detection device includes: a transmitter that transmits a high-frequency signal as a transmission signal; a receiver that receives a reception signal including a reflection signal formed by reflecting the transmission signal at a target; and a controller that detects the target based on a frequency of the reflection signal, and changes a frequency of the transmission signal based on a frequency of the reception signal.

8 Claims, 11 Drawing Sheets

DETECTION DEVICE

CROSS-REFERENCE TO RELATED APPLICATION

This application is based upon and claims the benefit of priority of the prior Japanese Patent Application No. 2019-023864 filed on Feb. 13, 2019, the entire contents of which are incorporated herein by reference.

FIELD

A certain aspect of the embodiments is related to a detection device.

BACKGROUND

There is known a detection device that transmits a high-frequency signal to a target and detects the target based on a reflection signal. It is known that a frequency obtained by frequency analysis is divided into a frequency range used for measuring a distance to a target and a relative velocity of the target and a frequency range unused for measurement, and an interference signal is detected based on a signal intensity in the frequency range unused for measurement (e.g. see Patent Document 1: Japanese Laid-open Patent Publication No. 2008-107280).

SUMMARY

According to an aspect of the present invention, there is provided a detection device including: a transmitter that transmits a high-frequency signal as a transmission signal; a receiver that receives a reception signal including a reflection signal formed by reflecting the transmission signal at a target; and a controller that detects the target based on a frequency of the reflection signal, and changes a frequency of the transmission signal based on a frequency of the reception signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When another device close to a detection device emits a signal, particularly a signal having a frequency close to a frequency of a transmission signal of the detection device, the detection device receives the signal, so that the signal might affect the detection of the target by the detection device.

The detection device according to a present embodiment can suppress the influence of the signal from another device.

Hereinafter, a description will be given of the present embodiment with reference to drawings.

First Embodiment

Figure 1:
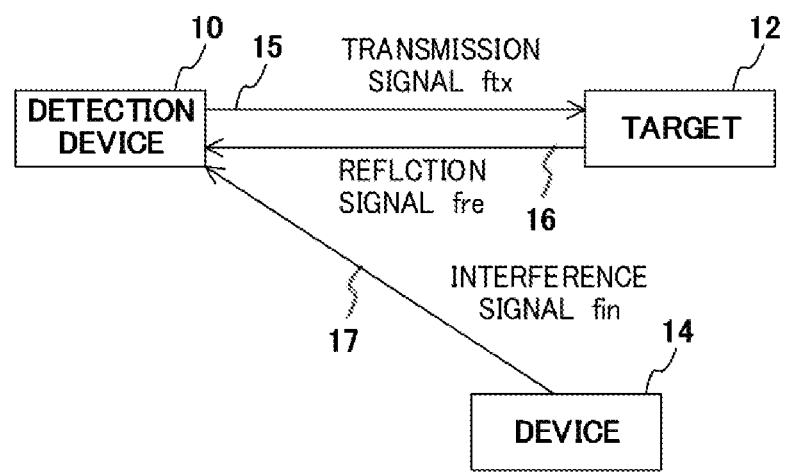
FIG. 1 is a block diagram illustrating the periphery of a detection device.

FIG. 1 is a block diagram illustrating the periphery of a detection device according to a first embodiment. A detection device 10 outputs a transmission signal 15. When the transmission signal 15 is reflected by a target 12, a reflection signal 16 is generated. The transmission signal 15 and the reflection signal 16 are high-frequency signals having frequencies ftx and fre, respectively. The frequency ftx of the transmission signal 15 is about 24 GHz, for example. When the target 12 is moving, the frequency fre of the reflection signal 16 changes by the Doppler effect. When the target 12 comes close to the detection device 10, the frequency fre is greater than the frequency ftx. When the target 12 is away from the detection device 10, the frequency fre is less than the frequency ftx. When the target 12 is stationary with respect to the detection device 10, the frequency fre is equal to the frequency ftx. Therefore, a relative speed of the target 12 with respect to the detection device 10 can be detected by calculating a difference between the frequencies ftx and fre. Further, it is possible to determine whether a moving object exists nearby by calculating the difference between the frequencies ftx and fre.

On the other hand, when a device 14 emits a signal 17 (hereinafter referred to as "interference signal") having a frequency fin close to the frequency of the reflection signal 16, the interference signal 17 interferes with the reflection signal 16 and affects the detection of the target 12 by the detection device 10. For example, the device 14 is the same type of device as the detection device 10. Even if the frequency of the signal emitted from the device 14 is different from the frequency ftx of the transmission signal 15 of the detection device 10, the frequency of the signal emitted from the device 14 comes close to the frequency ftx due to the influence of an ambient temperature or the like, so that the signal emitted from the device 14 may be the interference signal 17. In recent years, devices using radio waves in the 24 GHz band have increased, and a possibility that signals transmitted from the respective devices interfere with each other has also increased. Therefore, the detection device 10 according to the first embodiment detects the signal that may become the interference signal 17, and changes the frequency of the transmission signal 15.

Figure 2:
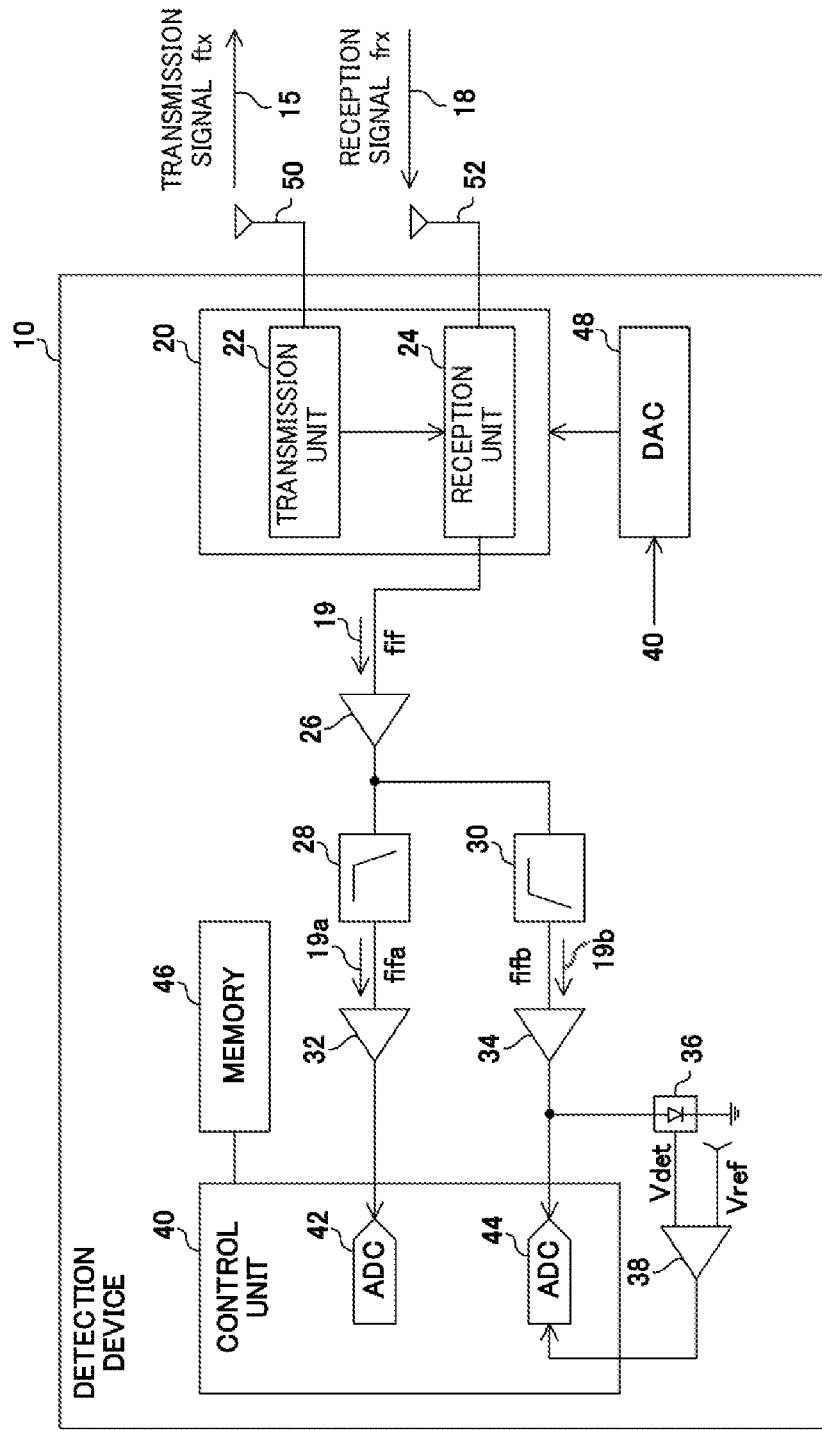
FIG. 2 is a block diagram illustrating the detection device.

FIG. 2 is a block diagram illustrating the detection device 10 according to the first embodiment. A transceiver 20 includes a transmission unit 22 and a reception unit 24. The transmission unit 22 transmits the transmission signal 15 that is the high-frequency signal from an antenna 50. The reception unit 24 receives a reception signal 18 from an antenna 52. The antennas 50 and 52 may be a common antenna. The reception signal 18 includes the reflection signal 16 and the interference signal 17 of FIG. 1. The reception unit 24 includes a mixer that mixes the transmission signal 15 output from the transmission unit 22 and the reception signal 18, and outputs an intermediate signal 19. A frequency fif of the intermediate signal 19 is calculated using the frequency ftx of the transmission signal 15 and a frequency frx of the reception signal 18, and the following equation is satisfied: fif=|ftx−frx|.

An amplifier 26 amplifies the intermediate signal 19. A low-pass filter (LPF) 28 passes a low-frequency signal 19a among the amplified intermediate signal 19. A high-pass filter (HPF) 30 passes a high-frequency signal 19b among the intermediate signal 19. Amplifiers 32 and 34 amplify the signals 19a and 19b, respectively.

The frequency fif of the intermediate signal 19 is a frequency difference between the transmission signal and the reception signal. When the frequency fif of the intermediate signal 19 is 10 kHz and 100 kHz, the moving speed of the target 12 corresponds to about 223 km/h and 2234 km/h, respectively. Assuming that the moving speed of the target 12 is about 100 km/h at most, a cutoff frequency of the LPF 28 is set to 10 kHz, for example, and a cutoff frequency of the HPF 30 is set to 100 kHz, for example. The signal 19a output from the LPF 28 is highly likely to be an intermediate signal (frequency fifa) based on the reflection signal 16 from the target 12 moving within a range of a normal moving speed. On the other hand, when the signal 19b is output from the HPF 30, it is unlikely thought that the reflection signal 16 from the target 12 moving at the normal moving speed has been received, and the signal 19b is highly likely to be be an intermediate signal (frequency fifb) based on the interference signal 17. Here, the cutoff frequencies of the LPF 28 and the HPF 30 can be set appropriately depending on an assumed moving speed of the target 12.

A control unit 40 is a processor such as a microcomputer or a central processing unit (CPU), for example, and includes analog/digital converters (ADCs) 42 and 44. The ADC 42 converts the amplified signal 19a into a digital signal and outputs the digital signal. The control unit 40 detects a state of the target 12 based on the frequency of the digital signal output from the ADC 42.

The ADC 44 converts the amplified signal 19b into a digital signal. A power detector 36 detects the intensity of the signal 19b. A comparator 38 compares a voltage Vdet output from the power detector 36 with a reference voltage Vref. The comparator 38 turns on the ADC 44 when the voltage Vdet is equal to or more than the reference voltage Vref, and turns off the ADC 44 when the voltage Vdet is less than the reference voltage Vref. The ADC 44 is used to detect the frequency of the interference signal. When the intensity of the signal 19b is equal to or more than a predetermined power, the ADC 44 converts the signal 19b into a digital signal and outputs the digital signal. The control unit 40 instructs the transmission unit 22 to change the frequency of the transmission signal 15 via a digital/analog converter (DAC) 48 based on the frequency of the reception signal 18 determined from the digital signal from the ADC 44.

A memory 46 is a semiconductor memory such as a Dynamic Random Access Memory (DRAM) or a Static Random Access Memory (SRAM), and stores information to be used for the change of the frequency of the transmission signal 15.

Figure 3:
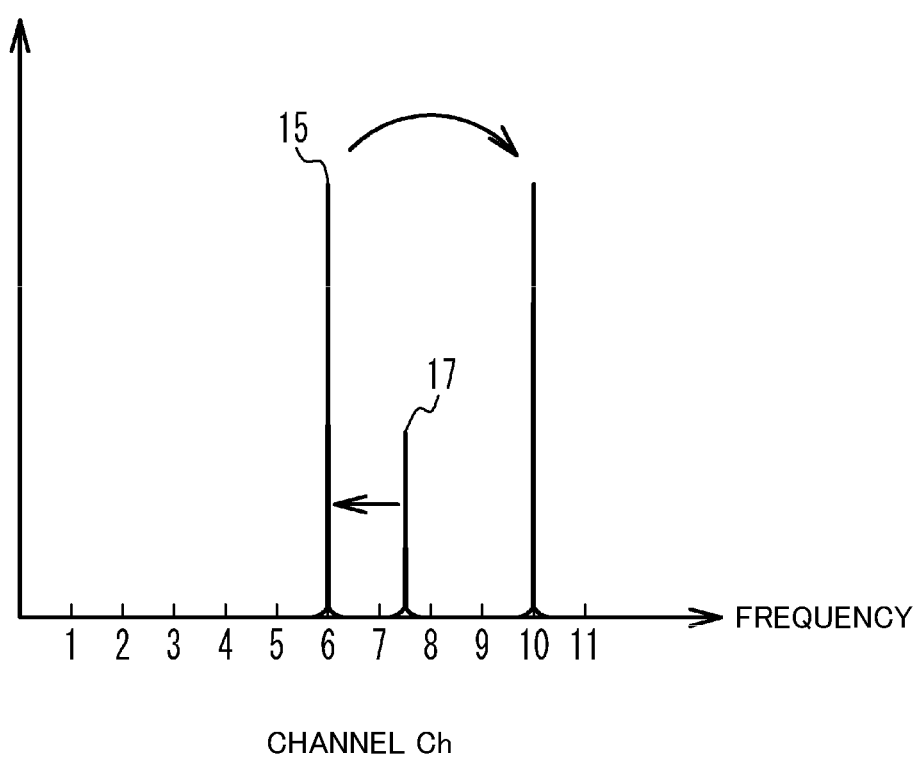
FIG. 3 is a diagram illustrating a transmission signal and an interference signal.

FIG. 3 is a diagram illustrating the transmission signal and the interference signal according to the first embodiment. A vertical axis of FIG. 3 indicates a signal intensity, for example. In FIG. 3, the intensity of the transmission signal 15 is illustrated to be larger than the intensity of the interference signal 17, but the intensity of the transmission signal 15 may be smaller than the intensity of the interference signal 17. The detection device 10 has a plurality of channels (for example, 11 channels) as frequencies used for the transmission signal 15. For example, the frequency of a channel Ch1 is 24.05 GHz, and the frequency of a Ch11 is 24.25 GHz. In the example of FIG. 3, the detection device 10 uses a channel Ch6, and the transmission unit 22 outputs the transmission signal 15 having the frequency of the channel Ch6. When determining that the frequency of the interference signal 17 comes close to the frequency of the channel Ch6, the control unit 40 changes a transmission channel of the transmission signal 15 to a channel Ch10, for example. Thereby, the transmission unit 22 outputs the transmission signal 15 having the frequency of channel Ch10. Therefore, it is possible to suppress the interference signal 17 from affecting the detection of the target. Although an example in which the number of channels is 11 is described, the detection device 10 needs to have at least the plurality of channels.

Figure 4:
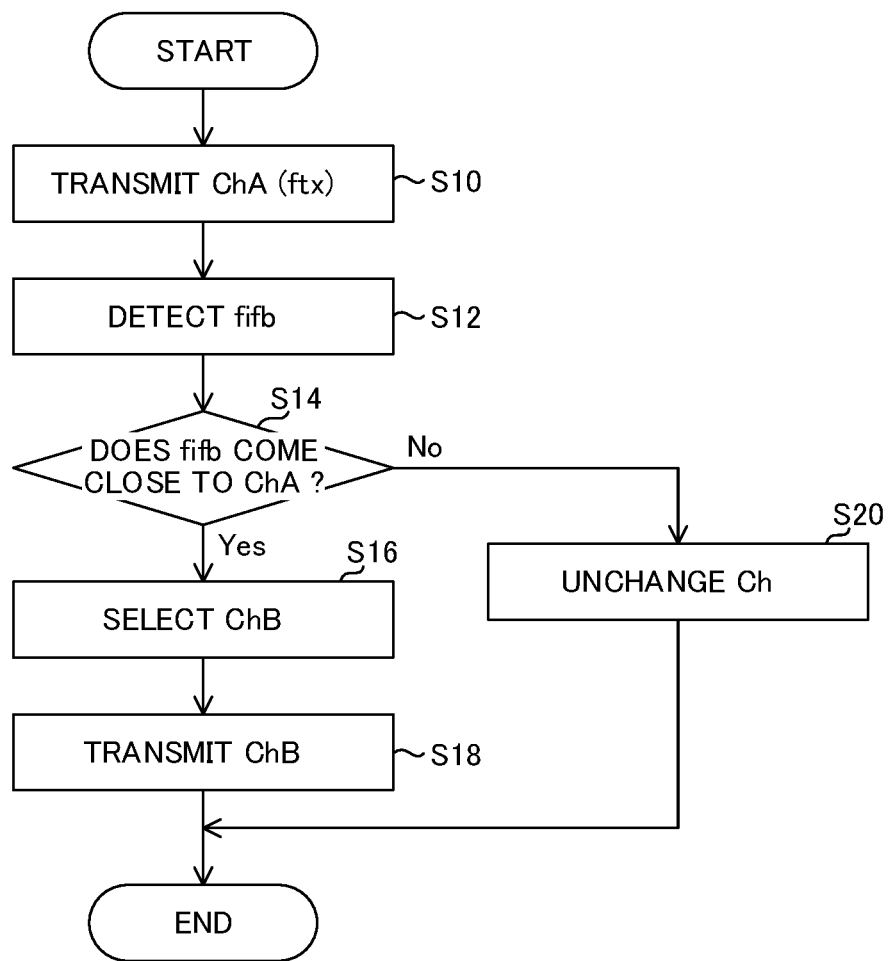
FIGS. 4 to 11 are flowcharts illustrating process to be executed by a control unit.

FIG. 4 is a flowchart illustrating processing to be executed by the control unit 40 according to the first embodiment. The control unit 40 causes the transmission unit 22 to transmit the transmission signal 15 of the channel ChA (the frequency is ftx) (S10). The channel ChA is the channel Ch6 in FIG. 3, for example. When detecting the signal 19b output from the HPF 30, the control unit 40 detects the frequency fifb of the signal 19b (S12), and determines whether the frequency fifb comes close to the frequency of ChA (S14). For example, when the frequency of the interference signal 17 comes close to the frequency of the channel Ch6 as illustrated in FIG. 3, the control unit 40 determines that the answer to the determination of S14 is Yes.

When the answer to the determination of S14 is Yes, the control unit 40 selects a new channel ChB (S16). The channel ChB is the channel Ch10, for example. The control unit 40 causes the transmission unit 22 to transmit the transmission signal 15 of the channel ChB (S18). When the answer to the determination of S14 is No, the control unit 40 does not change the channel of the transmission signal 15 (S20). In FIG. 4, when the signal 19b is not output, the channel is not changed.

According to the first embodiment, the control unit 40 determines whether the interference signal 17 is received based on the frequency fin of the reception signal 18, and changes the frequency ftx of the transmission signal 15 according to a result of the determination. Thereby, when the frequency of the interference signal 17 comes close to the frequency of the transmission signal 15, the frequency of the transmission signal 15 can be changed, and the influence on the detection of the target 12 based on the reflection signal 16 can be suppressed.

The LPF 28 and the HPF 30 (filter) separate the intermediate signal 19 having the frequency corresponding to the frequency difference frx−ftx between the reception signal 18 and the transmission signal 15 into the signal 19a (first signal) having the frequency lower than a predetermined frequency and the signal 19b (second signal) having the frequency higher than the predetermined frequency. The control unit 40 detects a state of the target 12 based on the frequency fifa of the signal 19a. In addition, the control unit 40 changes the frequency ftx of the transmission signal 15 based on the frequency fifb of the signal 19b. Thereby, since the content of the reception signal 18 is distinguished using the intermediate signal 19 for detecting the target 12, the circuit configuration can be reduced in size.

First Variation of First Embodiment

Figure 5:
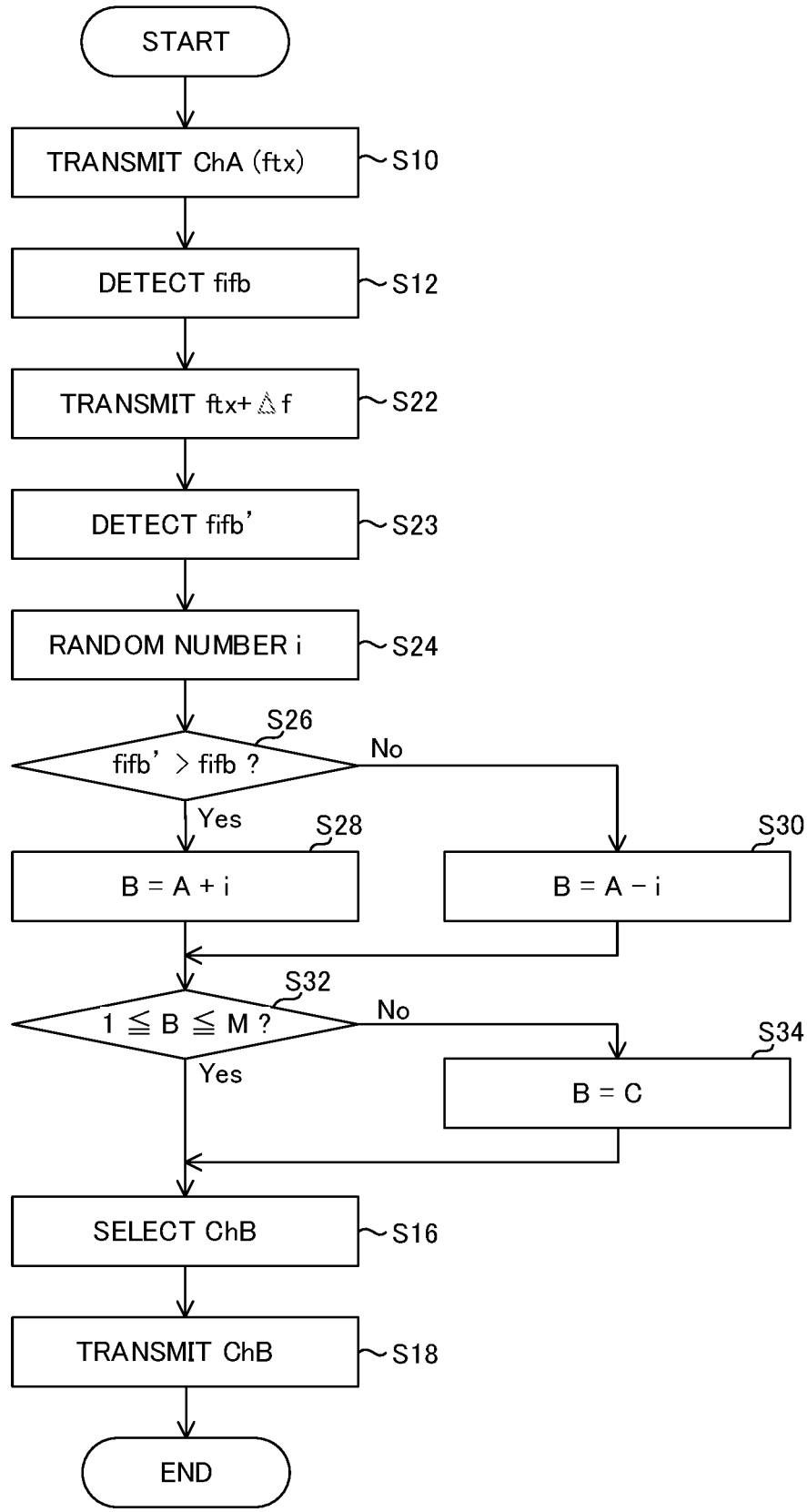

FIG. 5 is a flowchart illustrating processing to be executed by the control unit 40 according to a first variation of the first embodiment. When the frequency fifb is detected in S12, the control unit 40 causes the transmission unit 22 to transmit the transmission signal 15 having a frequency ftx 30 (S22). The frequency $\Delta f$ is a frequency smaller than a frequency interval to an adjacent channel. When detecting the signal 19b after the transmission signal 15 having the frequency ftx+$\Delta f$ is transmitted, the control unit 40 detects a frequency fifb' of the signal 19b (S23). The steps S22 and S23 are performed in order to determine whether the frequency fin of the interference signal 17 is higher or lower than the frequency ftx of the transmission signal 15. After the detection of the frequency fifb', the control unit 40 generates a random number i (S24). The random number i is an integer such as 1, 2, or 3.

The control unit 40 determines whether the frequency fifb' is more than the frequency fifb (S26), and calculate a channel number "B" for selecting a next channel based on the result of the determination. When the answer to the determination of S26 is Yes, the frequency of the interference signal 17 is lower than the frequency of the transmission signal 15. Therefore, the control unit 40 sets "A+i" to the channel number B (B=A+i) (S28), and selects a channel ChB having a frequency higher than a frequency of a channel ChA. When the answer to the determination of S26 is No, the frequency of the interference signal 17 is higher than the frequency of the transmission signal 15. Therefore, the control unit 40 sets "A−i" to the channel number B (B=A−i) (S30), and selects the channel ChB having a frequency lower than the frequency of the channel ChA.

The control unit 40 determines whether the channel number B satisfies "1≤B<M" (S32). The parameter "M" is a maximum number of channels, and 11 in FIG. 3, for example. When the answer to the determination of S32 is No, the channel ChB is not within the range of all channels. Therefore, the control unit 40 replaces the channel number B with a channel number C (S34), and selects a specific channel ChC. The channel ChC is the center channel of all channels for example, and is the channel Ch6 in FIG. 3. When the answer to the determination of S32 is Yes, the processing of S34 is not performed. Then, the control unit 40 changes the channel in S16 and S18 based on the channel number "B" obtained in S28 or S30. Thereby, the transmission signal 15 is set to the channel ChB. Since other processing is the same as that in the first embodiment, a description thereof is omitted.

When the control unit 40 changes the frequency of the transmission signal 15 regularly (for example, at a fixed interval), and the device 14 that emits the interference signal 17 regularly changes the frequency of the transmission signal as with the detection device 10, there is a possibility to eternally repeat the processing for changing the channel in FIG. 4. For this reason, in the first variation, the control unit 40 randomly selects one of the plurality of channels Ch1 to Ch11 using the random number i when changing the frequency ftx of the transmission signal 15. Thereby, the detection device 10 and the device 14 can be suppressed from repeating the same channel change.

The control unit 40 determines whether the frequency of the interference signal 17 is higher or lower than the frequency of the transmission signal 15 as illustrated in S26. When the frequency of the interference signal 17 is lower than the frequency of the transmission signal 15, the control unit 40 changes the frequency of the transmission signal 15 so as to increase it as illustrated in S28. When the frequency of the interference signal 17 is higher than the frequency of the transmission signal 15, the control unit 40 changes the frequency of the transmission signal 15 so as to decrease it as illustrated in S30. Thus, the control unit 40 changes the frequency ftx of the transmission signal 15 so that the frequency ftx of the transmission signal 15 is further away from the frequency fin of the interference signal 17. Thereby, the frequency ftx of the transmission signal 15 is away from the frequency fin of the interference signal 17, and the influence of the interference signal 17 can be eliminated.

Second Variation of First Embodiment

Figure 6:
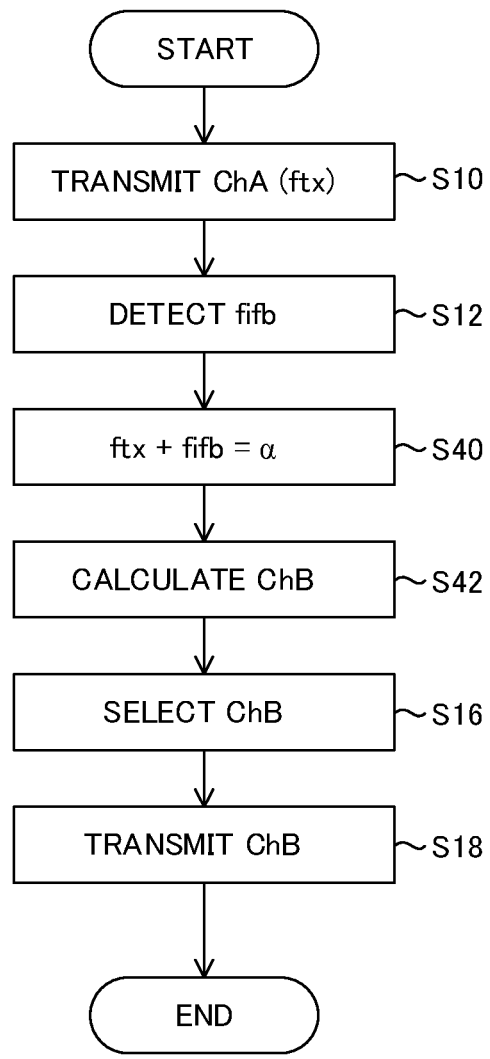

FIG. 6 is a flowchart illustrating processing to be executed by the control unit 40 according to a second variation of the first embodiment. The device 14 uses the same channels Ch1 to Ch11 in FIG. 3 as those of the detection device 10. When the control unit 40 detect the signal 19b, the control unit 40 calculates the sum of the frequencies ftx and fifb as a frequency α of the interference signal 17 (ftx+fifb=α) (S40), and calculates the channel ChB based on the frequency α (S42). For example, when the control unit 40 determines that the device 14 uses a channel closest to the frequency α, the control unit 40 sets a channel unused by the device 14 as the channel ChB. For example, when the frequency α is the closest to the channel Ch6, the control unit 40 can determine that the device 14 uses the channel Ch6. In this case, the control unit 40 sets a channel Ch4 or Ch8 as the channel ChB. Then, the processing of S16 and S18 is performed. Thereby, the control unit 40 can select the channel ChB which is away from the channel used by the device 14. Since other processing is the same as that in the first embodiment, a description thereof is omitted.

Third Variation of First Embodiment

Figure 7:
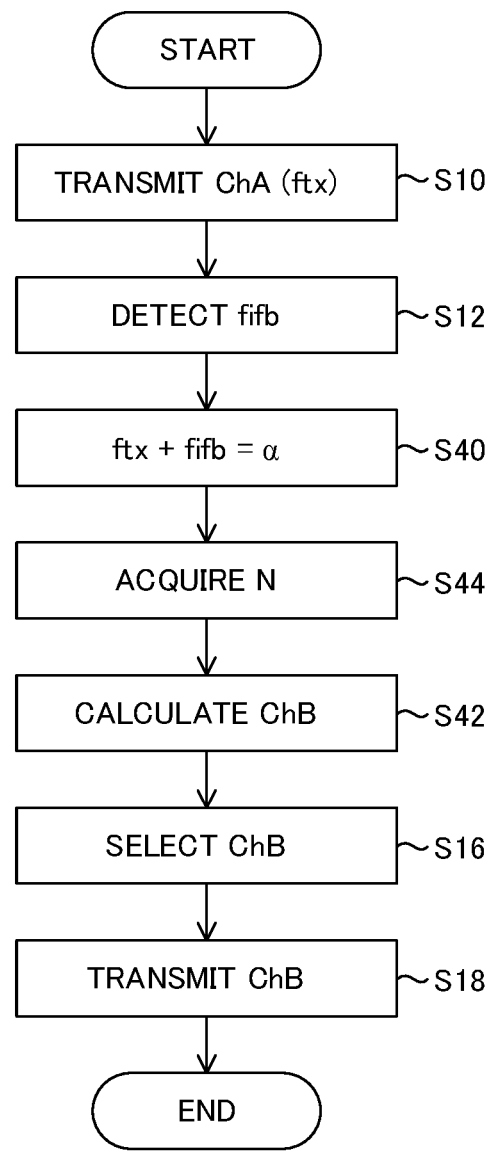

FIG. 7 is a flowchart illustrating processing to be executed by the control unit 40 according to a third variation of the first embodiment. The memory 46 stores a channel number N of a channel ChN close to the frequency of the interference signal 17 in advance. When the device 14 is installed for example, the channel number N of the channel ChN close to the frequency of the signal emitted from the device 14 is stored in the memory 46. After calculating the frequency α by the processing S10 to S40, the control unit 40 acquires the channel number N from the memory 46 (S44). It should be noted that the control unit 40 does not select the channel number N of the channel ChN when calculating the channel ChB in S42. Then, the processing of S16 and S18 is performed. Since other processing is the same as that in the second variation, a description thereof is omitted.

According to the third variation, the memory 46 stores in advance the channel number N which is information on a frequency having a possibility of causing interference with the reflection signal 16. The control unit 40 changes the frequency of the transmission signal 15 by calculating the channel ChB based on the channel number N as illustrated in S42. Thereby, it is possible to suppress the frequency fix of the transmission signal 15 from matching the frequency of the channel ChN. The number of channel numbers N to be stored in the memory 46 may be one or more.

Fourth Variation of First Embodiment

Figure 8:
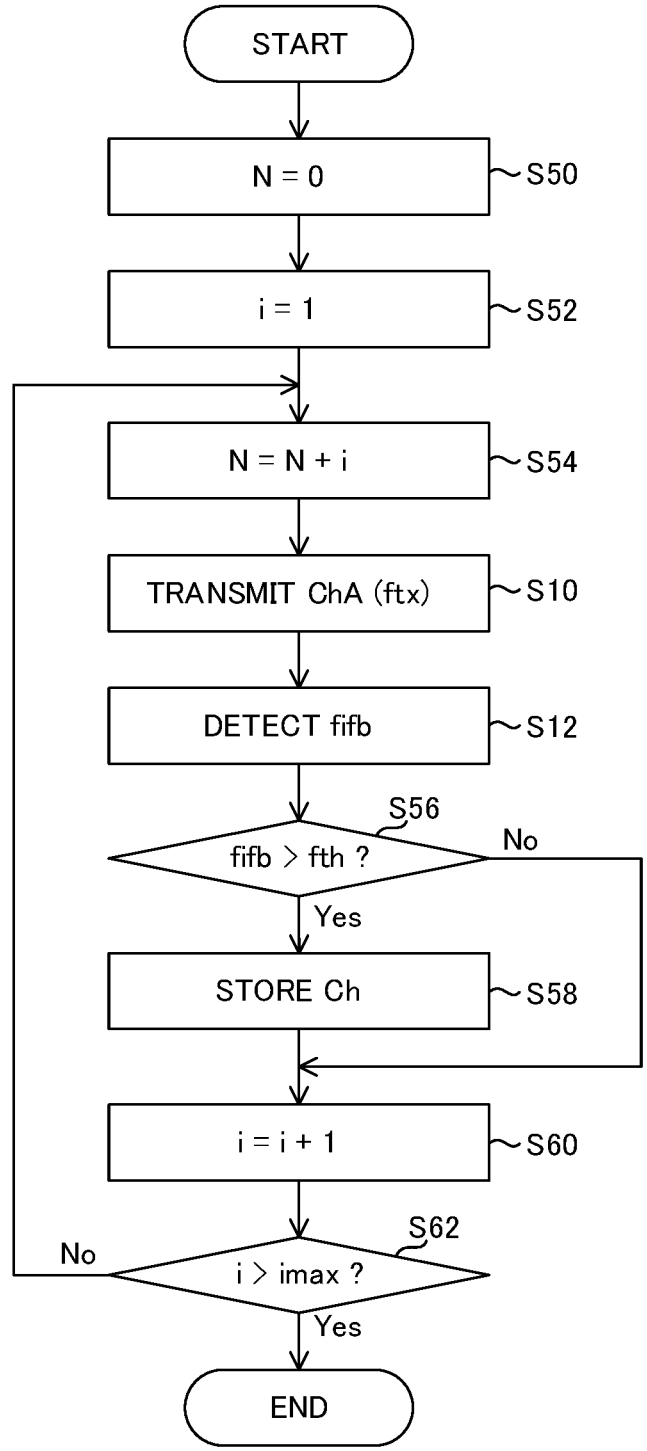

A fourth variation of the first embodiment indicates an example of detecting the channel number N in the third variation of the first embodiment. FIG. 8 is a flowchart illustrating processing to be executed by the control unit 40 according to a third variation of the first embodiment, and particularly illustrates processing for confirming the presence or absence of a frequency band that interferes with the reflection signal. The control unit 40 performs the following processing at any timing. The control unit 40 sets the channel number N=0 (S50), and sets a change amount i=1 (S52), as initial values. The control unit 40 increments the channel number N by the change amount i (N=N+i) (S54). In the case of the channel number N=0 and the change amount i=1, the sum of them "N+i" is 1. Therefore, the control unit 40 selects the channel Ch1, and performs the processing of S10 and S12 to detect the frequency fifb of the signal 19b.

The control unit 40 determines whether the frequency fifb is greater than a threshold frequency fth based on the frequency fifb detected in S12 (S56). The threshold frequency fth is 100 kHz, for example. When the answer to the determination of S56 is Yes, there is a high possibility that the interference signal 17 exists in the channel selected in S54. Therefore, the control unit 40 stores the channel number N set in S54 into the memory 46 (S58). Then, the control unit 40 increments the change amount i by 1 (i=i+1) (S60). When the answer to the determination of S56 is No, the processing advances to S60. The control unit 40 determines whether the change amount i is greater than a maximum channel number imax (i>imax) (S62). The maximum channel number imax of FIG. 3 is 11. When the answer to the determination of S62 is Yes, the processing of FIG. 8 is terminated. When the answer to the determination of S62 is No, the processing returns to S54, and the control unit 40 determines whether the interference signal 17 exists in the channel of a next channel number N+1.

According to the fourth variation, the control unit 40 detects the frequency having the possibility of causing interference with the reflection signal 16 by changing the frequency of the transmission signal 15 by scanning, for example, and stores, in the memory 46, information regarding a frequency and a channel at which the signal that interferes with the reflection signal 16 is received, based on the detection result. Thereby, the use of the transmission signal 15 having the frequency close to the frequency of the interference signal 17 can be avoided in advance, and the interference due to the interference signal 17 can be suppressed. The processing of FIG. 8 may be executed periodically and/or aperiodically when the detection device 10 is installed, when the detection device 10 is turned on, or when the detection device 10 is used, or the like.

Fifth Variation of First Embodiment

Figure 9:
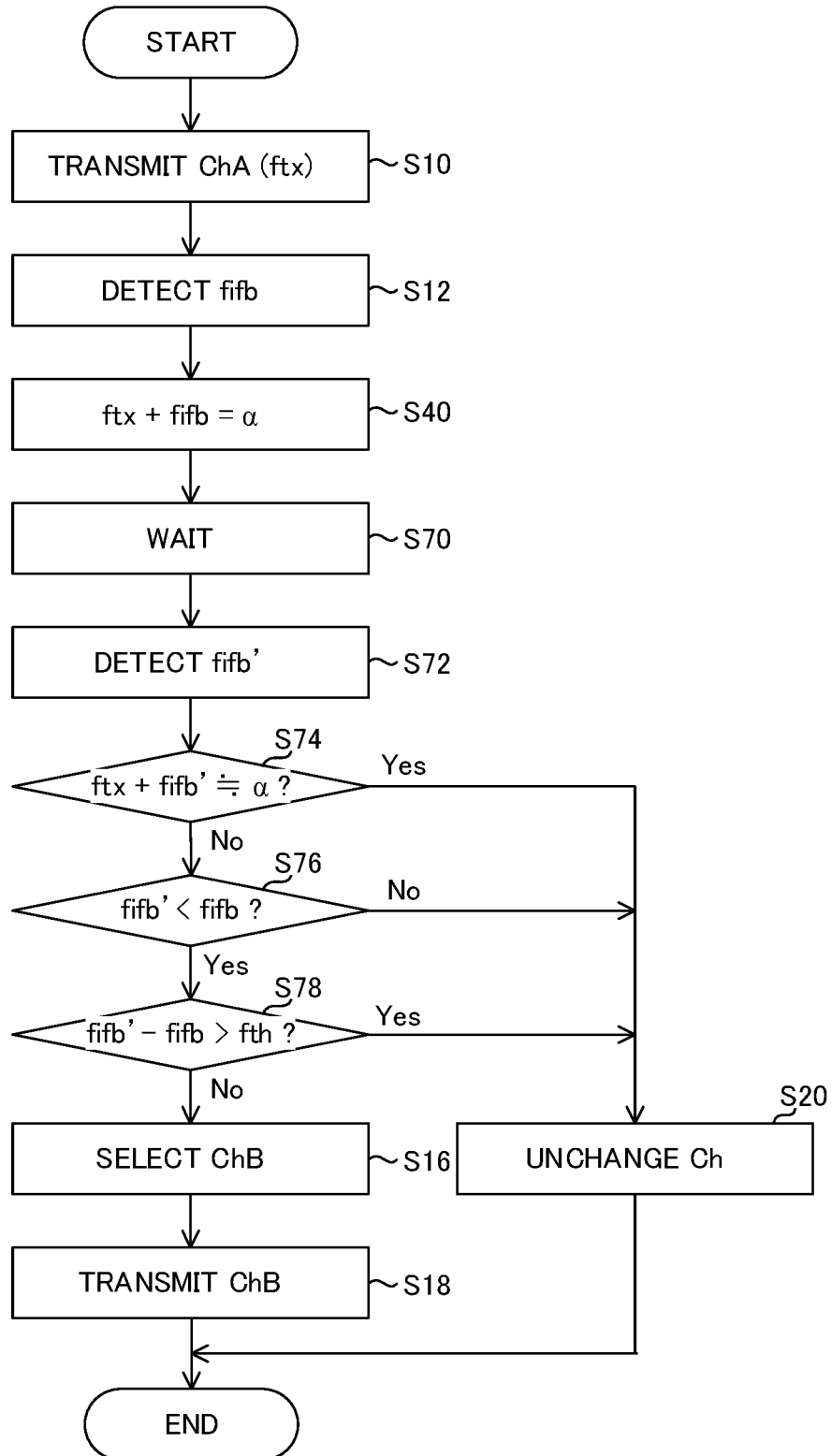

FIG. 9 is a flowchart illustrating processing to be executed by the control unit 40 according to a fifth variation of the first embodiment. After S10 and S12, the control unit 40 calculates the sum of the frequencies ftx and fifb as the frequency α of the interference signal 17 (ftx+fifb=α) as in FIG. 6 (S40), and waits for a predetermined period (S70). The predetermined period is 1 second, for example. Then, the control unit 40 detects the frequency fifb' of the signal 19b (S72), and determines whether the control unit 40 determines whether the sum of the frequencies ftx and fifb' approximates the frequency α (S74). For example, when a difference between the frequency α and the sum of the frequencies ftx and fifb' is equal to or less than a predetermined frequency, the control unit 40 determines that the sum of the frequencies ftx and fifb' approximates the frequency α.

When the sum of the frequencies ftx and fifb' approximates the frequency α, it is considered that the frequency fin of the interference signal 17 has hardly changed. For this reason, there is a low possibility that the frequency fin comes close to the frequency ftx of the transmission signal 15. Therefore, when the answer to the determination of S74 is Yes, the control unit 40 does not change the channel Ch (S20).

On the other hand, when the answer to the determination of S74 is No, it is considered that the frequency fin of the interference signal 17 has changed. Therefore, the control unit 40 determines whether the frequency fifb' is less than the frequency fifb (S76). When the answer to the determination of S76 is No, it is considered that the frequency fin is away from the frequency ftx, and hence the control unit 40 does not change the channel Ch (S20).

When the answer to the determination of S76 is Yes, the frequency fin comes close to the frequency ftx. In this case, the control unit 40 determines whether a difference between the frequencies fifb' and fifb is greater than the threshold frequency fth (S78). When the answer to the determination of S78 is Yes, the change in the frequency fin is very fast. For this reason, even if the frequency fin comes close to the frequency ftx, the frequency fin immediately moves away from the frequency ftx, and it is considered that the interference signal interferes with the transmission signal only for an instant and the possibility of affecting the detection of the target is small. Therefore, the control unit 40 does not change the channel Ch (S20).

When the answer to the determination of S78 is No, the frequency fin comes close to the frequency ftx, and there is a possibility that the interference signal interferes with the transmission signal for a long time. Therefore, the control unit 40 changes the channel of the transmission signal to the channel ChB in S16 and S18. The processing for changing to the channel ChB and other processing are the same as those in the first embodiment, and a description thereof is omitted.

According to the fifth variation, the control unit 40 changes the frequency ftx of the transmission signal 15 based on a change in the frequency fin of the interference signal 17 and a degree of the change in the frequency fin. Thereby, the interference due to the interference signal 17 can be suppressed.

Sixth Variation of First Embodiment

Figure 10:
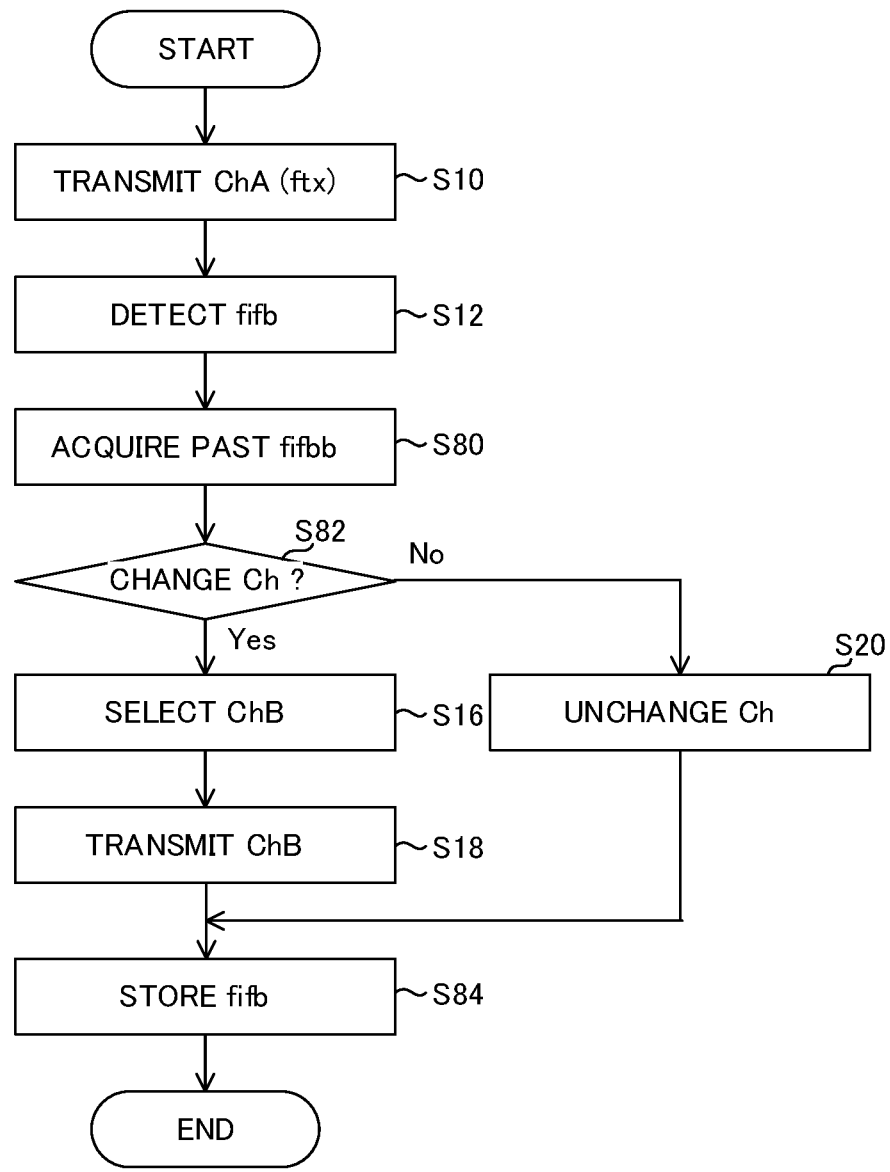

FIG. 10 is a flowchart illustrating processing to be executed by the control unit 40 according to a sixth variation of the first embodiment. After transmitting the transmission signal from the channel ChA in S10, the control unit 40 acquires the frequency fifb based on the reception signal in S12. The control unit 40 acquires the information on a frequency fibbb stored at the time of signal reception in the past from the memory 46 (S80). The control unit 40 determines whether to change the channel for transmitting the transmission signal based on the past frequency fibbb and the frequency fifb detected in S12 (S82). When the frequency fin of the interference signal 17 gradually comes close to the frequency ftx, the frequency fifb gradually increases with lapse of time. When it is determined that there is such a tendency, the control unit 40 determines that the answer to the determination of S82 is Yes, and changes the channel in S16 and S18. When the answer to the determination of S82 is No, the control unit 40 does not change the channel Ch (S20). Then, the control unit 40 stores the frequency fibb detected in S12 into the memory 46 (S84). The processing of S84 may be executed at any timing after S12. Since other processing is the same as that in the first embodiment, a description thereof is omitted.

The control unit 40 stores the past frequency fifbb into the memory 46, and compares the currently acquired frequency fifbb with the past frequency fifbb to determine the magnitude relationship thereof. Thereby, the control unit 40 can recognize a change speed of the frequency fifb, that is, a change amount of the frequency fifb per unit time. The control unit 40 changes the frequency ftx of the transmission signal 15 based on a change speed of the frequency fin of the interference signal 17. Thereby, the interference due to the interference signal 17 can be suppressed. The detection of frequency fifb in FIG. 10 can be performed periodically, for example.

Seventh Variation of First Embodiment

Figure 11:
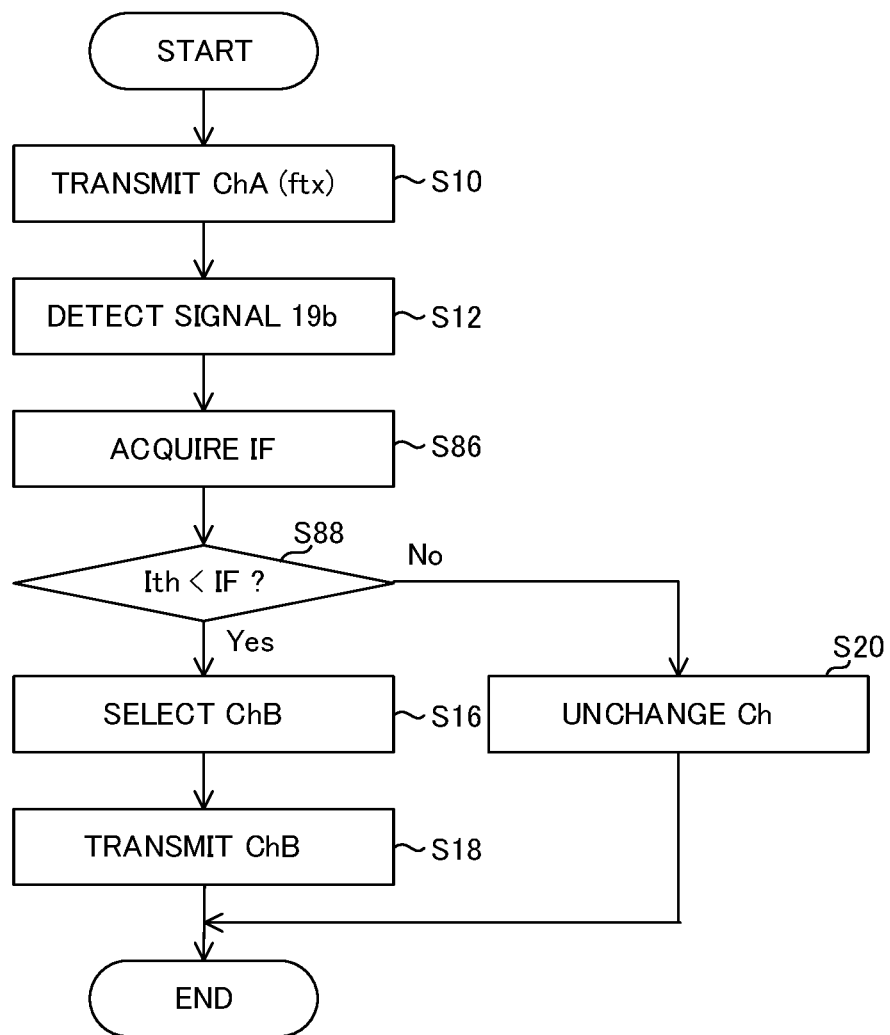

FIG. 11 is a flowchart illustrating processing to be executed by the control unit 40 according to a seventh variation of the first embodiment. After detecting the signal 19b (S85), the control unit 40 acquires an intensity IF of the signal 19b (S86). The intensity of the signal 19b is substantially proportional to an electric field intensity of the interference signal 17. The control unit 40 determines whether a threshold intensity Ith is smaller than the intensity IF (S88). When the answer to the determination of S88 is No, the intensity of the interference signal 17 is small, and the possibility that the interference signal 17 interferes with the reflection signal 16 is small. Therefore, the control unit 40 does not change the channel Ch in S20. When the answer to the determination of S88 is Yes, the intensity of the interference signal 17 is equal to or more than a predetermined value, and the possibility that the interference signal 17 interferes with the reflection signal 16 is large. Therefore, the control unit 40 changes the channel in S16 and S18. Since other processing is the same as that in the first embodiment, a description thereof is omitted.

According to the seventh variation, the control unit 40 changes the frequency ftx of the transmission signal 15 based on the intensity of the signal 19b. Thereby, when the possibility that the interference signal 17 interferes with the reflection signal 16 is small, the frequency ftx can be unchanged.

The processing may be executed by appropriately combining any of the first to the seventh variations of the first embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A detection device comprising:
    a transmitter that transmits a high-frequency signal as a transmission signal;
    a receiver that receives a reception signal including a reflection signal formed by reflecting the transmission signal at a target;
    a controller that detects the target based on a frequency of the reflection signal, and changes a frequency of the transmission signal based on a frequency of the reception signal; and
    a filter that separates an intermediate signal generated by mixing the reception signal and the transmission signal into a first signal having a frequency band lower than a predetermined frequency and a second signal having a frequency band higher than the predetermined frequency,
    wherein the controller detects the target based on the first signal, and changes the frequency of the transmission signal based on a frequency of a peak of the second signal.

2. The detection device as claimed in claim 1, wherein the controller randomly selects a channel to be used for transmitting the transmission signal from a plurality of channels corresponding to different frequencies when changing the frequency of the transmission signal.

3. The detection device as claimed in claim 1, wherein the controller changes the frequency of the transmission signal based on information on a frequency having a possibility of causing interference with the reflection signal stored in a memory in advance.

4. The detection device as claimed in claim 3, wherein the controller detects the frequency having the possibility of causing interference with the reflection signal by changing the frequency of the transmission signal, and stores information on the detected frequency in the memory.

5. The detection device as claimed in claim 1, wherein the controller changes the frequency of the transmission signal so that the frequency of the transmission signal is further away from a frequency of a signal other than the reflection signal.

6. The detection device as claimed in claim 1, wherein the controller changes the frequency of the transmission signal based on a change in a frequency of a signal other than the reflection signal.

7. The detection device as claimed in claim 1, wherein the controller changes the frequency of the transmission signal based on an intensity of the peak of the second signal.

8. A detection device comprising:
    a transmitter that transmits a high-frequency signal as a transmission signal;
    a receiver that receives a reception signal including a reflection signal formed by reflecting the transmission signal at a target;
    a controller that detects the target based on a frequency of the reflection signal, and changes a frequency of the transmission signal based on a frequency of the reception signal; and
    a filter that separates an intermediate signal generated by mixing the reception signal and the transmission signal into a first signal having a frequency band lower than a predetermined frequency and a second signal having a frequency band higher than the predetermined frequency,
    wherein the controller detects the target based on the first signal, and changes the frequency of the transmission signal based on a frequency of a peak of the second signal and an intensity of the peak of the second signal.

* * * * *

UNITED STATES PATENT AND TRADEMARK OFFICE
CERTIFICATE OF CORRECTION

| | | |
|---|---|---|
| PATENT NO. | : 11,650,283 B2 | Page 1 of 1 |
| APPLICATION NO. | : 16/774649 | |
| DATED | : May 16, 2023 | |
| INVENTOR(S) | : Maiko Saito et al. | |

It is certified that error appears in the above-identified patent and that said Letters Patent is hereby corrected as shown below:

On the Title Page

Column 1, Line 5, Item (72), 3rd Inventor delete "Syunichi Iizuka," and insert --Shunichi Iizuka,--.

Signed and Sealed this
Fourteenth Day of November, 2023

Katherine Kelly Vidal
*Director of the United States Patent and Trademark Office*